(12) United States Patent
Yin et al.

(10) Patent No.: US 11,677,465 B2
(45) Date of Patent: Jun. 13, 2023

(54) HYSTERESIS-BASED LINK FLAPPING PREVENTION IN AN OPTICAL NETWORK

(71) Applicant: MICROSOFT TECHNOLOGY LICENSING, LLC, Redmond, WA (US)

(72) Inventors: Yawei Yin, Redmond, WA (US); Jamie Gaudette, Redmond, WA (US); Binbin Guan, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/491,277

(22) Filed: Sep. 30, 2021

(65) Prior Publication Data

US 2023/0012193 A1    Jan. 12, 2023

Related U.S. Application Data

(60) Provisional application No. 63/220,976, filed on Jul. 12, 2021.

(51) Int. Cl.
*H04B 10/079* (2013.01)
*H04B 10/03* (2013.01)

(52) U.S. Cl.
CPC ......... *H04B 10/0795* (2013.01); *H04B 10/03* (2013.01)

(58) Field of Classification Search
None
See application file for complete search history.

(56) References Cited

U.S. PATENT DOCUMENTS

| | | | | |
|---|---|---|---|---|
| 7,724,676 | B2* | 5/2010 | Gerstel | H04J 14/0227 370/242 |
| 7,788,547 | B1* | 8/2010 | Oliva | H04L 1/203 714/751 |
| 10,404,376 | B2* | 9/2019 | Schmogrow | H04B 10/2543 |
| 10,554,301 | B2* | 2/2020 | Woodward | H04J 14/0271 |
| 10,587,339 | B1* | 3/2020 | Al Sayeed | H04B 10/07953 |
| 10,735,333 | B2* | 8/2020 | Kachrani | H04L 47/32 |
| 10,931,369 | B2* | 2/2021 | Maccaglia | H04L 41/0816 |
| 11,228,368 | B1* | 1/2022 | Yin | H04B 10/07953 |
| 2011/0182574 | A1* | 7/2011 | Peng | H04B 10/695 398/202 |

FOREIGN PATENT DOCUMENTS

EP    3598348 A1    1/2020

OTHER PUBLICATIONS

De Arruda Mello et al., Performance Evaluation, Mar. 2021 (Year: 2021).*
"International Search Report and Written Opinion Issued in PCT Application No. PCT/US22/034807", dated Oct. 18, 2022, 10 Pages.

* cited by examiner

*Primary Examiner* — Jai M Lee
(74) *Attorney, Agent, or Firm* — Han Gim; Newport IP, LLC

(57) ABSTRACT

A preFEC BER of a selected optical link is determined. A FEC Detected Degrade (FDD) threshold, FEC Excessive Degrade (FED) threshold, and FEC limit threshold are obtained for the selected optical link. The FDD threshold is less than the FED threshold and the FED threshold is less than the FEC limit. Based on the FDD threshold, FED threshold, the FEC limit, and a determination that a postFEC BER=0, it is determined whether a link down condition of the selected optical link can be asserted or de-asserted.

20 Claims, 8 Drawing Sheets

HYSTERESIS-BASED LINK FLAPPING PREVENTION IN AN OPTICAL NETWORK

PRIORITY APPLICATION

The present application is a non-provisional application of and claims priority to, the earlier filed U.S. Provisional Application Ser. No. 63/220,976 filed on Jul. 12, 2021, the contents of the listed application are hereby incorporated by reference in their entirety.

BACKGROUND

A data center is a facility that houses computer systems and various networking, storage, and other related components. Data centers may, for example, provide computing services to businesses and individuals as a remote computing service or provide "software as a service" (e.g., cloud computing). A data center may utilize fiber optic networks within a data center, between data centers, and to communicate with other networks. Fiber optic networks typically carry data on multiple channels for multiple end-to-end links.

It is important to prevent downtime due to hardware, software, and network failures and other issues that may prevent the operation of services provided by the data center. When a data center experiences connectivity or data transmission issues, loss of data and services may occur, preventing users from providing quality services to their downstream customers, which may result in lost revenue and customer dissatisfaction. Production loss and inefficiencies with respect to computing resources can be exacerbated when the data center is unable to quickly isolate and correct the cause of a data transmission problem.

It is with respect to these considerations and others that the disclosure made herein is presented.

SUMMARY

The disclosed embodiments describe technologies for the prevention of link flapping in optical networks. Link flapping generally refers to situations where an optical link alternates between up and down states.

In wavelength division multiplexing (WDM) optical communication systems, analog signal qualities represented by bit error rate (BER), optical signal to noise ratio (OSNR), and other parameters may change continuously according to the physical conditions of the network and environment. When a routing link goes down because of poor quality of the optical signals, the BER or ONSR values typically exceed a specified threshold, which may be referred to as the forward error correction (FEC) limit or required OSNR.

Link flapping can occur when the optical signal quality remains close to the specified threshold and fluctuates by small amounts above and below the threshold. This can cause the routing link to flap back and forth between the up and down status for the link. Such instability can cause significant impacts to data throughput due to continuous flapping and interruptions to data flow. Flapping can be further exacerbated when a primary path is switched to a backup path when the primary path is down, resulting in continuous switching between the primary and backup paths.

Rather than using a single threshold, the disclosed embodiments provide a way to use different thresholds when a link goes down and when a link is brought back up. In one embodiment, the threshold for when the link goes down may be lower than the threshold for when the link goes back up. In other words, the link will go down only if the optical signal quality is worse than threshold T1, and the link should only be brought back up if the optical signal quality exceeds a different threshold T2. The gap H between threshold T1 and T2, i.e., $H=T2-T1$, may be referred to as the hysteresis.

By providing a hysteresis-based link flapping prevention mechanism, the potential degradation or loss of data channels and costly efforts to recover the degraded or lost channels may be avoided. Furthermore, by providing a hysteresis-based link flapping prevention mechanism, extensive modification to the network may be avoided, thus saving the higher costs of duplicating or re-engineering the physical network. Maintaining the availability and integrity of data channels is crucial for managing optical networks, and the described techniques can enable a cost-effective way to achieve such objectives.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The present disclosure describes a hysteresis-based link flapping prevention mechanism for optical networks for the prevention of link flapping in optical networks. Link flapping generally refers to situations where an optical link alternates between up and down states.

In wavelength division multiplexing (WDM) optical communication systems, analog signal qualities represented by bit error rate (BER), optical signal to noise ratio (OSNR), and other parameters may change continuously according to the physical conditions of the network and environment. When a routing link goes down because of poor quality of the optical signals, the BER or ONSR values typically exceed a specified threshold, which may be referred to as the forward error correction (FEC) limit or required OSNR.

Link flapping can occur when the optical signal quality remains close to the specified threshold and fluctuates by small amounts above and below the threshold. This can cause the routing link to flap back and forth between the up and down status for the link. Such instability can cause significant impacts to data throughput due to continuous flapping and interruptions to data flow. Flapping can be further exacerbated when a primary path is switched to a backup path when the primary path is down, resulting in continuous switching between the primary and backup paths.

In current networks, hysteresis is typically not applied in DSPs or FEC algorithms for determining the link up/down status in an optical WDM link. Additionally, some embodiments provide for the use of multiple measurements to implement a hysteresis-based link management system.

Rather than using a single threshold, the disclosed embodiments provide a way to use different thresholds when a link goes down and when a link is brought back up. In one embodiment, the threshold for when the link goes down may be lower than the threshold for when the link goes back up. In other words, the link will go down only if the optical signal quality is worse than threshold T1, and the link should only be brought back up if the optical signal quality exceeds a different threshold T2. The gap H between threshold T1 and T2, i.e., H=T2−T1, may be referred to as the hysteresis.

By providing a hysteresis-based link flapping prevention mechanism, the potential degradation or loss of data channels and costly efforts to recover the degraded or lost channels may be avoided. Furthermore, by providing a hysteresis-based link flapping prevention mechanism, extensive modification to the network may be avoided, thus saving the higher costs of duplicating or re-engineering the physical network. Maintaining the availability and integrity of data channels is crucial for managing optical networks, and the described techniques can enable a cost-effective way to achieve such objectives.

Figure 1:
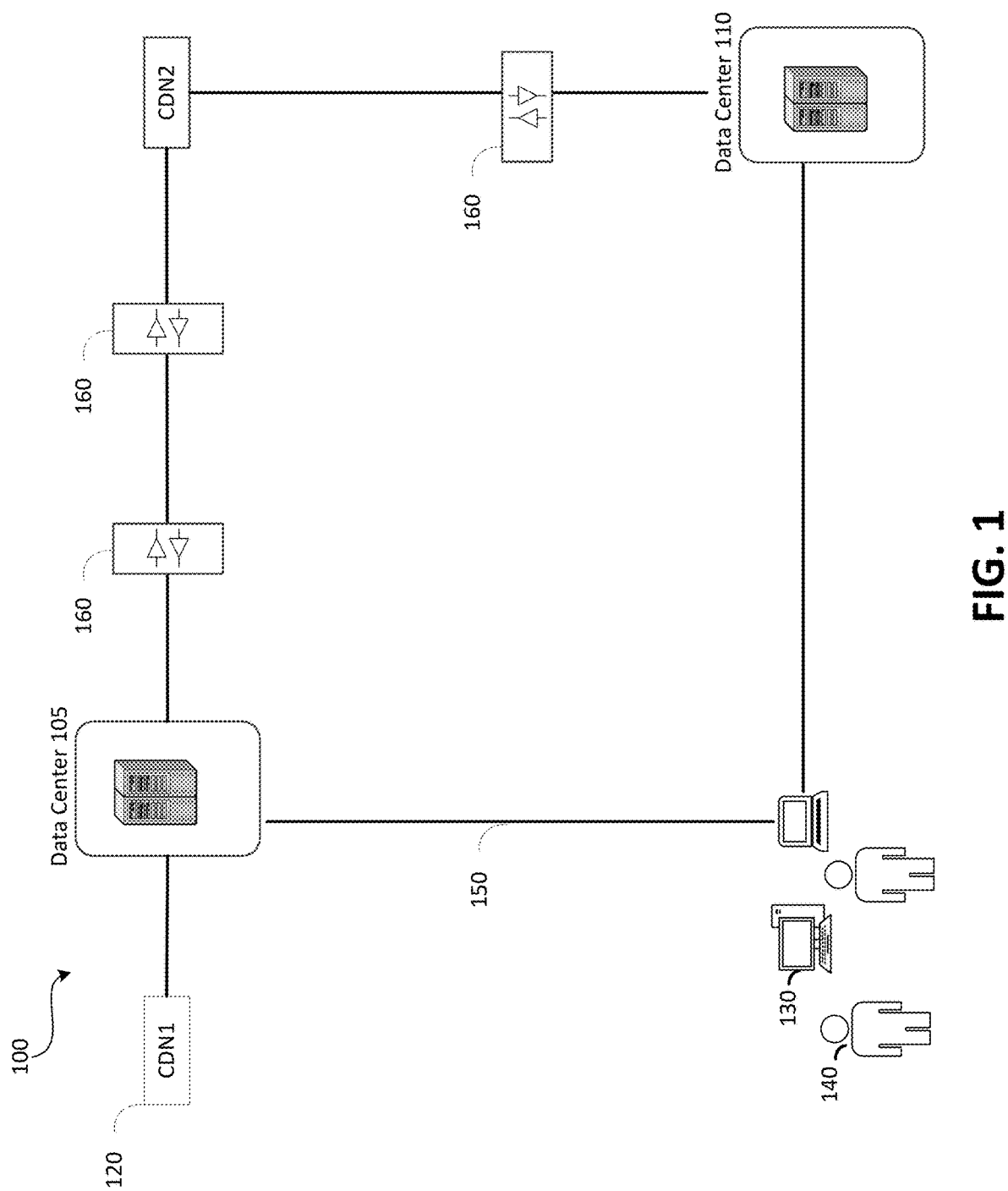
FIG. 1 is a diagram illustrating an example data center environment in accordance with the present disclosure.

FIG. 1 illustrates an example environment 100 in which embodiments of the disclosure may be implemented. Data centers 105 and 110 may be connected by a fiber optic network 150, and may provide computing resources to users 140 (which may be referred herein singularly as "a user 140" or in the plural as "the users 140") accessing the computing resources using client computers 130 (which may be referred herein singularly as "a computer 130" or in the plural as "the computers 130"). The computing resources provided by the data centers 105 and 110 may include various types of resources, such as computing resources, data storage resources, data communication resources, and the like. Data centers 105 and 110 may further allow distribution networks 120 to provide access to computing resources. Depending on physical distances, in some embodiments, amplifiers 160 may be installed at various points in the network as optical repeaters.

Figure 2:
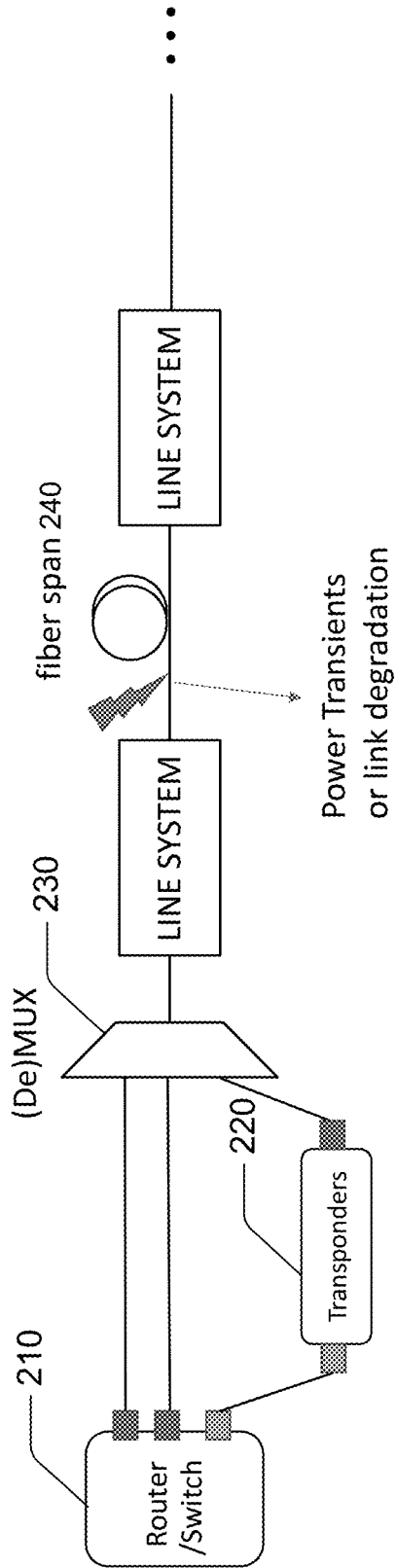
FIG. 2 is an example measurement environment in accordance with the present disclosure.

FIG. 2 illustrates additional details in an example environment in which embodiments of the disclosure may be implemented. The example environment may include a router or switch 210, one or more transponders 220, and a multiplexer/demultiplexer 230. FIG. 2 illustrates that power transients or link degradation may cause an increase in errors as seen in the fiber span 240.

Figure 3:
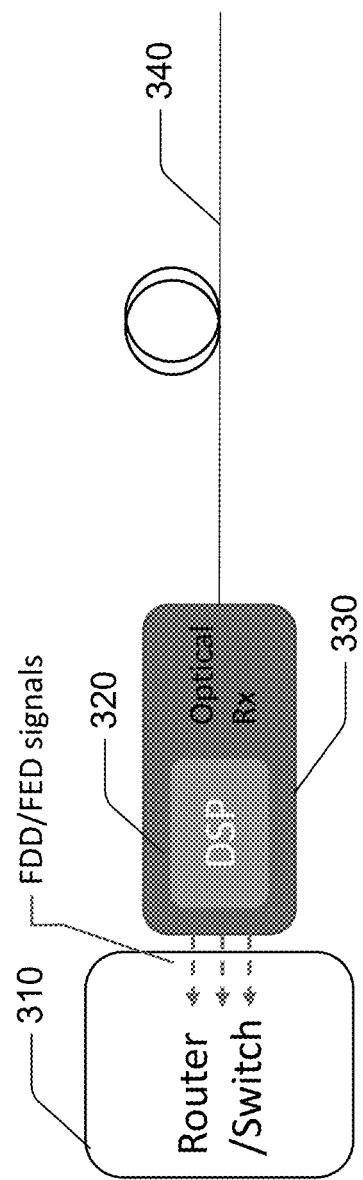
FIG. 3 is an example measurement environment in accordance with the present disclosure.

FIG. 3 illustrates additional details in an example environment in which embodiments of the disclosure may be implemented. In an embodiment, only the Rx direction of the signal may be considered. Provided that there are FEC algorithms used on the Rx, the disclosed techniques can be implemented regardless as to whether a DSP is implemented. Additionally, if a DSP 320 is implemented in the Rx direction, whether the DSP is on a pluggable module that plugs into a router or switch 310, or on a transponder device that is connected to a router through the client ports through grey optics, the disclosed techniques can be implemented.

Figure 4:
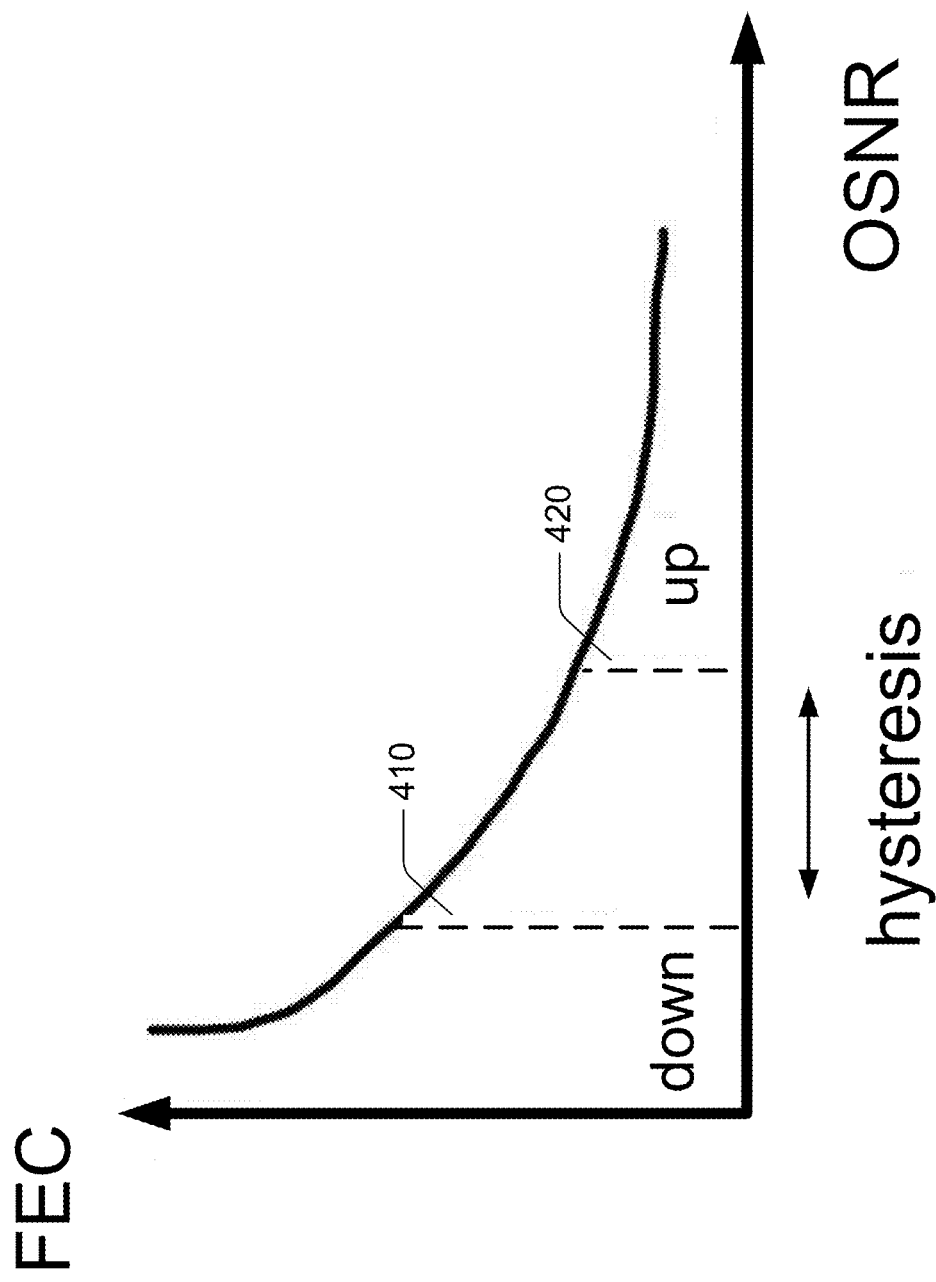
FIG. 4 is an example diagram showing hysteresis in accordance with the present disclosure.

FIG. 4 illustrates an example implementation of hysteresis in an optical network. A link down level can be set at level 410, and a link up level may be set at level 420. In an embodiment, continuously changing analog signals may be used to assert/de-assert the link down (LD) signals and communicate to the router for traffic re-routing or restoration.

One example of a continuously changing analog signal is the preFEC BER, which can work with multiple thresholds to trigger different alarms. Existing alarms can include FEC Detected Degrade (FDD) and FEC Excessive Degrade (FED), etc., but these alarms are typically not used to assert/deassert LD.

In an embodiment, different thresholds may be used, such as T2 (for asserting the FDD alarm), T1 (for asserting the FED alarm), and T0 (FEC Limit). Additionally, "if postFEC BER==0" may be used to determine if the link down condition should be asserted or de-asserted.

In an embodiment, T0>T1>T2. In one example, T0=1.2e−2, T1=1e−2, and T2=8e−3).

Figure 5:
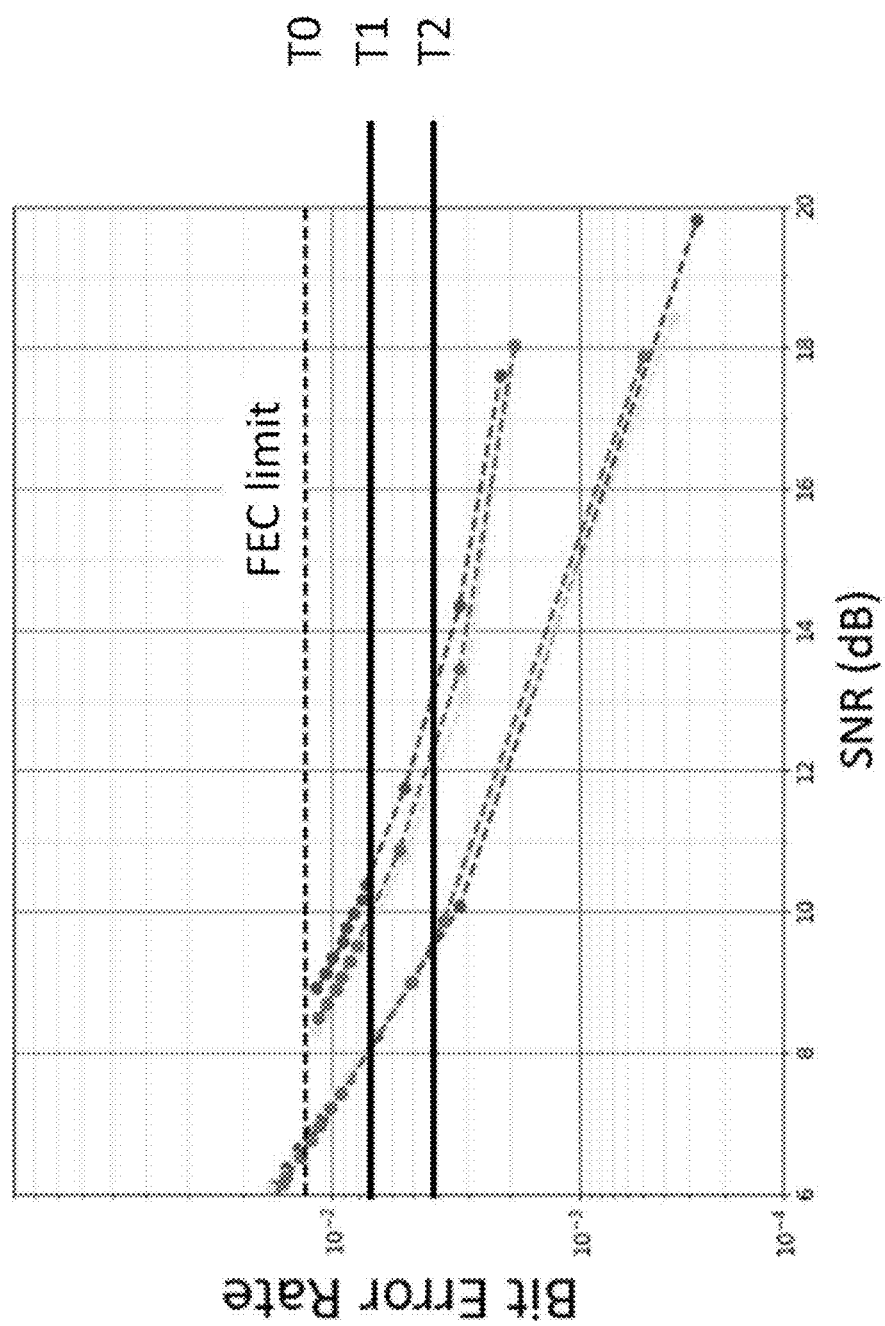
FIG. 5 is an example diagram showing BER levels in accordance with the present disclosure.
Figure 6:
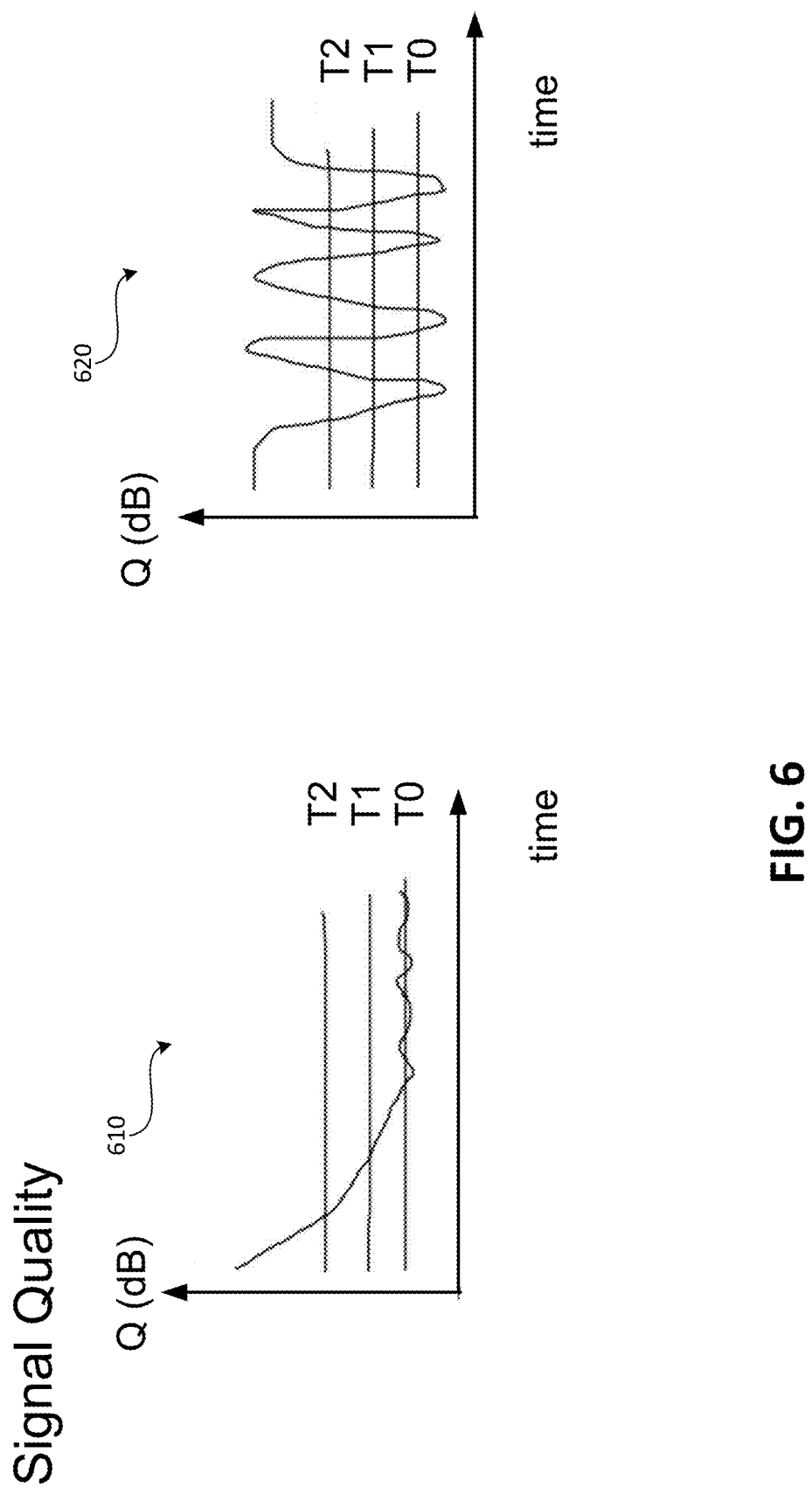
FIG. 6 is an example diagram showing hysteresis in accordance with the present disclosure.

FIG. 5 illustrate examples of hysteresis applied in an optical network. In the figure, different colors of lines represents different type of optical transceivers. In one example of a failure scenario:

FIG. 6 illustrates the two different failure scenarios. Graph 610 illustrates an example where the link quality slowly degrades and the link preFEC BER increases and slowly cross T2, T1, and T0 in order and then fluctuates at around T0.

In an existing approach, T2 will assert FDD alarm, T1 will assert the FED alarm, and T0 will assert the Local Fault (LF) alarm and send the alarms to the routers. The routers will report the FDD and FED alarms but do nothing, while declaring a link down condition when it receives the Local Fault alarm. Since the signal quality stays around T0 and fluctuates, the LF alarm comes and goes, therefore causing the router to flap the link status between up and down states.

In an example implementation of the disclosed techniques, an alarm may be declared if any threshold of T2, T1, or T0 is crossed and PostFEC error !=0. When the router sees the LF, it declares a Link Down (LD) state. However, the optical Rx will not clear the LF alarm unless "PostFEC error==0 and (FED clears or FDD clears)". Users can also choose to implement "PostFEC error==0 and FED clears and FDD clears" if the link quality can be brought back to a higher quality under normal operational conditions. In an embodiment, the LD status is not de-asserted unless the signal quality is higher where there are no postFEC errors and the BER is well below T0, below T1, and/or even below T2. In this case, the link will not flap when the signal quality fluctuates within a narrow range around T0.

In another example of a failure scenario illustrated by graph 620 in FIG. 6:

The link quality quickly degrades and the link preFEC BER increases rapidly across T2, T1, and T0 and then comes back.

In an existing approach, the FDD, FED, and LF alarms are quickly asserted and then de-asserted, and because the LF alarm comes and goes, the link flaps.

In an embodiment, in addition to clearing the LF alarm on the optical Rx under the condition of "PostFEC error=0 and (FED clears or FDD clears)" or "PostFEC error=0 and FED clears and FDD clears", a hold-off timer can be added on the router to de-assert the LD status to ensure that the link is up and stable for a time threshold. As an example, the hold-off timer can be set at 3 minutes, which means any rapid and dramatic change of preFEC BER within 3 minutes will not cause any flapping of the router link status.

The various embodiments disclosed herein use hysteresis (e.g., using the different thresholds T0, T1, and T2) to implement different thresholds for declaring link down and link up conditions, and therefore prevent flapping when the signal quality is fluctuating in a small range around the LD threshold. In the case of rapid and dramatically changing signal quality, the use of hysteresis along with a hold-off timer may prevent the link from flapping.

It should be appreciated that the examples described above are merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing or networking device may comprise any combination of hardware or software that can interact and perform the described types of functionality, including without limitation desktop or other computers, database servers, network storage devices and other network devices, tablets, intermediate networking devices, and various other devices that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 7:
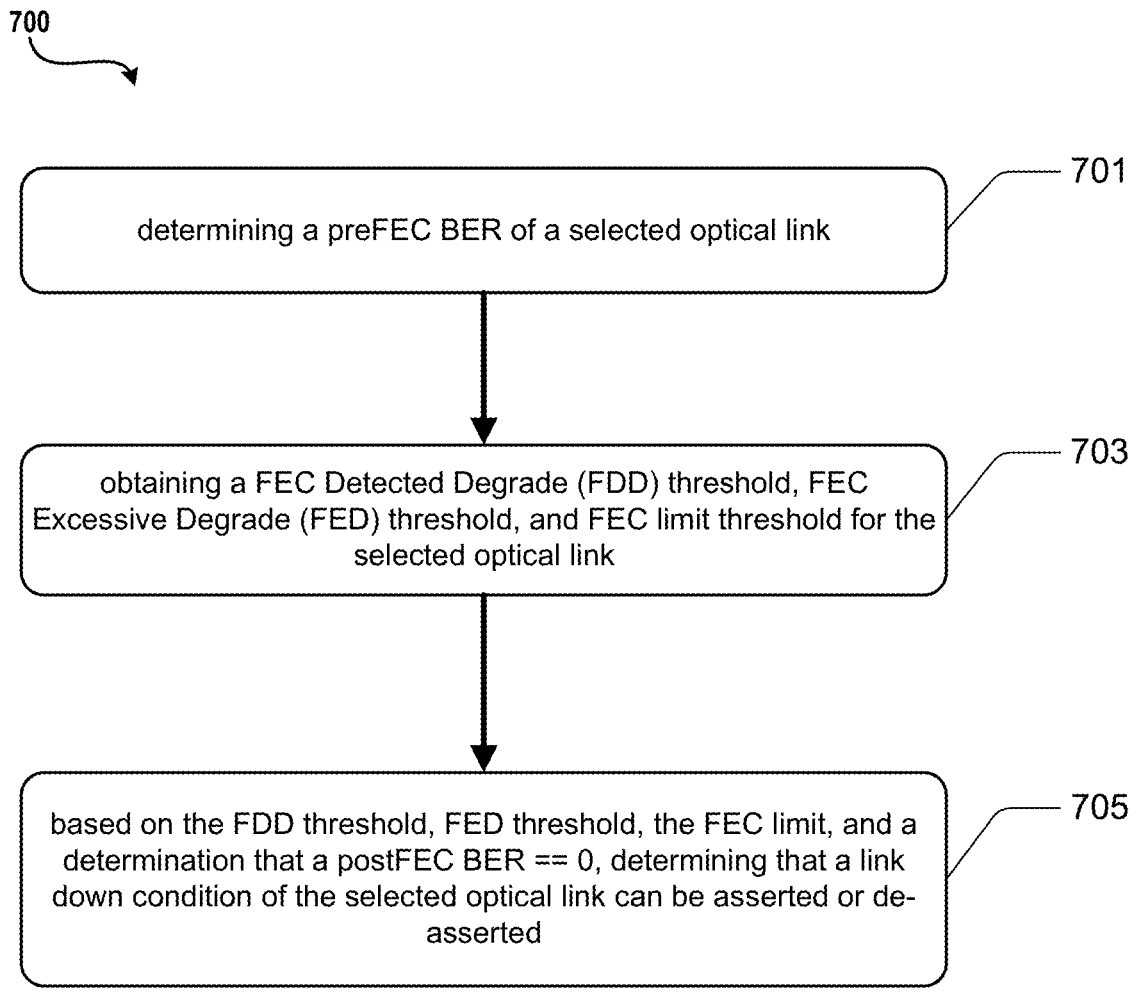
FIG. 7 is a flowchart depicting an example procedure in accordance with the present disclosure.

Turning now to FIG. 7, illustrated is an example flowchart for preventing flapping in accordance with the present disclosure. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 700 are described herein as being implemented, at least in part, by modules running the features disclosed herein and can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 700 may be also implemented in many other ways. For example, the routine 700 may be implemented, at least in part, by a processor of another remote computer or a local circuit. In addition, one or more of the operations of the routine 700 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

The operations in FIG. 7 can be performed, for example, by a device configured to communicatively couple to an optical communications network. The optical communications network may include an optical transmission medium configured to transmit data signals on a plurality of optical signals carried on a plurality of optical wavelengths. The optical communications network may further comprise a plurality of optical data links interconnected by a plurality of switching nodes, the optical data links comprising a plurality of data channels, as described above with respect to any one of FIGS. 1-6.

Operation 701 illustrates determining a preFEC BER of a selected optical link. Operation 701 may be followed by operation 703. Operation 703 illustrates obtaining a FEC Detected Degrade (FDD) threshold, FEC Excessive Degrade (FED) threshold, and FEC limit threshold for the selected optical link. In an embodiment, the FDD threshold is less than the FED threshold and the FED threshold is less than the FEC limit. Operation 703 may be followed by operation 705. Operation 705 illustrates based on the FDD threshold, FED threshold, the FEC limit, and a determination that a postFEC BER=0, determining that a link down condition of the selected optical link can be asserted or de-asserted.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 8:
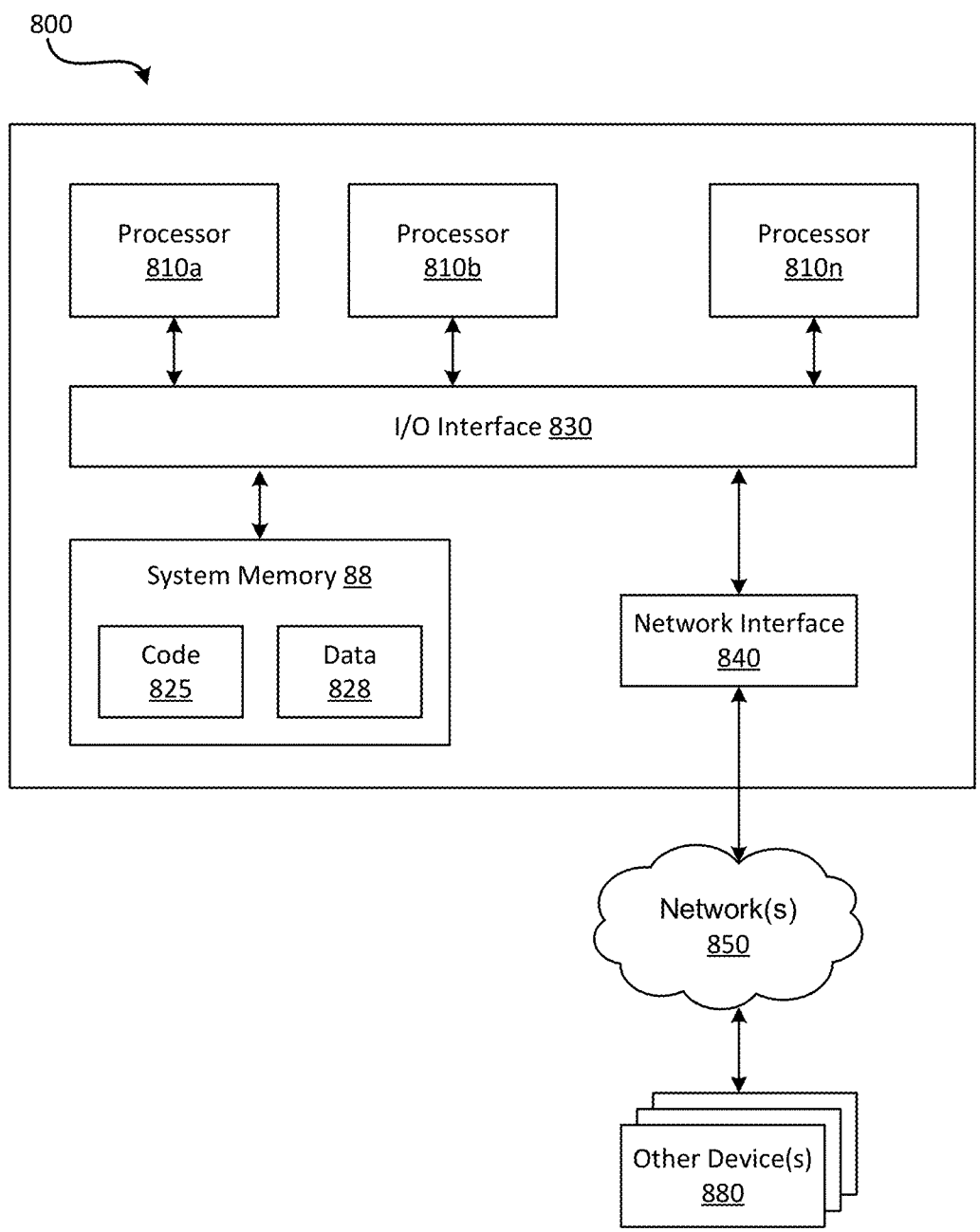
FIG. 8 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 8 illustrates such a general-purpose computing device 800. In the illustrated embodiment, computing device 800 includes one or more processors 810*a*, 810*b*, and/or 810*n* (which may be referred herein singularly as "a processor 810" or in the plural as "the processors 810") coupled to a system memory 88 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x88, PowerPC, SPARC, or MIPS ISAs, or any other suitable ISA. In multiprocessor systems, each of processors 810 may commonly, but not necessarily, implement the same ISA.

System memory 88 may be configured to store instructions and data accessible by processor(s) 810. In various embodiments, system memory 88 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 88 as code 825 and data 828.

In one embodiment, I/O interface 830 may be configured to coordinate I/O traffic between the processor 810, system memory 88, and any peripheral devices in the device, including network interface 840 or other peripheral interfaces. In some embodiments, I/O interface 830 may perform any necessary protocol, timing, or other data transformations to convert data signals from one component (e.g., system memory 88) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components. Also, in some embodiments some or all of the functionality of I/O interface 830, such as an interface to system memory 88, may be incorporated directly into processor 810.

Network interface 840 may be configured to allow data to be exchanged between computing device 800 and other device or devices 880 attached to a network or network(s) 850, such as other computer systems or devices as illustrated in FIGS. 1 through 4, for example. In various embodiments, network interface 840 may support communication via any suitable wired or wireless general data networks, such as types of Ethernet networks, for example. Additionally, network interface 840 may support communication via telecommunications/telephony networks such as analog voice networks or digital fiber communications networks, via storage area networks such as Fibre Channel SANs or via any other suitable type of network and/or protocol.

In some embodiments, system memory 88 may be one embodiment of a computer-accessible medium configured to store program instructions and data as described above for FIGS. 1-6 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 800 as system memory 88 or another type of memory. Further, a computer-accessible medium may include transmission media or signals such as electrical, electromagnetic or digital signals, conveyed via a communication medium such as a network and/or a wireless link, such as may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1:
An optical communications network comprising:
a plurality of optical data links comprising a plurality of data channels; and a system communicatively coupled to the plurality of optical data links, the system comprising a processor and memory storing executable instructions that configure the system to perform operations comprising:

determining a pre-forward error correction (FEC) bit error rate (BER) of a selected optical link;

obtaining a FEC Detected Degrade (FDD) threshold, FEC Excessive Degrade (FED) threshold, and FEC limit threshold for the selected optical link, wherein the FDD threshold is less than the FED threshold and the FED threshold is less than the FEC limit threshold; and based on the FDD threshold, FED threshold, the FEC limit threshold, and a postFEC BER, determining that a link down condition of the selected optical link can be asserted or de-asserted.

Clause 2: The optical communications network of clause 1, further comprising executable instructions that configure the system to perform operations comprising declaring an alarm if any of the FDD threshold, FED threshold, or FEC limit threshold is crossed and postFEC BER !=0.

Clause 3: The optical communications network of any of clauses 1-2, wherein the alarm is not cleared unless postFEC BER==0 and (FED clears or FDD clears).

Clause 4: The optical communications network of any of clauses 1-3, wherein the alarm is not cleared unless "PostFEC error==0 and FED clears and FDD clears".

Clause 5: The optical communications network of any of clauses 1-4, further comprising executable instructions that configure the system to perform operations comprising de-asserting LD status when there are no postFEC errors and the BER is below one of T0, T1, or T2.

Clause 6: The optical communications network of any of clauses 1-5, further comprising executable instructions that configure the system to perform operations comprising implementing a hold-off timer for de-asserting the link down condition.

Clause 7: The optical communications network of any of clauses 1-6, wherein any change of the preFEC BER within a time specified by the hold-off timer does not cause a flapping of a link status.

Clause 8: A method implemented on an optical communications network comprising a plurality of optical data links comprising a plurality of data channels, the method comprising:

determining a preFEC BER of a selected optical link;

obtaining a FEC Detected Degrade (FDD) threshold, FEC Excessive Degrade (FED) threshold, and FEC limit threshold for the selected optical link, wherein the FDD threshold is less than the FED threshold and the FED threshold is less than the FEC limit threshold; and based on the FDD threshold, FED threshold, the FEC limit threshold, and a postFEC BER, determining that a link down condition of the selected optical link can be asserted or de-asserted.

Clause 9: The method of clause 8, further comprising declaring an alarm if any of the FDD threshold, FED threshold, or FEC limit threshold is crossed and postFEC BER !=0.

Clause 10: The method of any of clauses 8 and 9, wherein the alarm is not cleared unless postFEC BER==0 and (FED clears or FDD clears).

Clause 11: The method of any of clauses 8-10, wherein the alarm is not cleared unless "PostFEC error==0 and FED clears and FDD clears".

Clause 12: The method of any of clauses 8-11, further comprising de-asserting LD status when there are no postFEC errors and the BER is below one of T0, T1, or T2.

Clause 13: The method of any of clauses 8-12, further comprising implementing a hold-off timer for de-asserting the link down condition.

Clause 14: The method of any of clauses 8-13, wherein any change of the preFEC BER within a time specified by the hold-off timer does not cause a flapping of a link status.

Clause 15: A device configured to communicatively couple to an optical transmission medium of an optical communications network, the device configured to:

determine a preFEC BER of a selected optical link;

obtain a FEC Detected Degrade (FDD) threshold, FEC Excessive Degrade (FED) threshold, and FEC limit threshold for the selected optical link, wherein the FDD threshold is less than the FED threshold and the FED threshold is less than the FEC limit; and based on the FDD threshold, FED threshold, the FEC limit, and a postFEC BER, determine that a link down condition of the selected optical link can be asserted or de-asserted.

Clause 16: The device of clause 15, the device further configured to declare an alarm if any of the FDD threshold, FED threshold, or FEC limit threshold is crossed and postFEC BER !=.

Clause 17: The device of any of clauses 15 and 16, wherein the alarm is not cleared unless postFEC BER==0 and (FED clears or FDD clears).

Clause 18: The device of any of the clauses 15-17, wherein the alarm is not cleared unless "PostFEC error==0 and FED clears and FDD clears".

Clause 19: The device of any of the clauses 15-18, the device further configured to de-assert LD status when there are no postFEC errors and the BER is below one of T0, T1, or T2.

Clause 20: The device of any of the clauses 15-19, the device further configured to implement a hold-off timer for de-asserting the link down condition.

The invention claimed is:

1. An optical communications network comprising:
    a plurality of optical data links comprising a plurality of data channels; and
    a system communicatively coupled to the plurality of optical data links, the system comprising a processor and memory storing executable instructions that configure the system to perform operations comprising:
    determining a pre-forward error correction (preFEC) bit error rate (BER) of a selected optical link;
    obtaining a FEC Detected Degrade (FDD) threshold, FEC Excessive Degrade (FED) threshold, and FEC limit threshold for the selected optical link, wherein the FDD threshold is less than the FED threshold and the FED threshold is less than the FEC limit threshold;
    asserting a link down condition when the preFEC BER rises above the FEC limit threshold; and
    de-asserting the link down condition when the preFEC BER falls below the FED threshold.

2. The optical communications network of claim 1, further comprising executable instructions that configure the system to perform operations comprising declaring an alarm if any of the FDD threshold, FED threshold, or FEC limit threshold is crossed and postFEC BER !=0.

3. The optical communications network of claim 2, wherein the alarm is not cleared unless postFEC BER is less than 10−e15 and (FED clears or FDD clears).

4. The optical communications network of claim 2, wherein the alarm is not cleared unless "PostFEC error is less than 10−e15 and FED clears and FDD clears".

5. The optical communications network of claim 1, further comprising executable instructions that configure the system to perform operations comprising de-asserting LD status when postFEC errors are less than 10–e15 and the BER is below one of T0, T1, or T2.

6. The optical communications network of claim 1, further comprising executable instructions that configure the system to perform operations comprising implementing a hold-off timer for de-asserting the link down condition.

7. The optical communications network of claim 6, wherein any change of the preFEC BER within a time specified by the hold-off timer does not cause a flapping of a link status.

8. A method implemented on an optical communications network comprising a plurality of optical data links comprising a plurality of data channels, the method comprising:
   determining a preFEC BER of a selected optical link;
   obtaining a FEC Detected Degrade (FDD) threshold, FEC Excessive Degrade (FED) threshold, and FEC limit threshold for the selected optical link, wherein the FDD threshold is less than the FED threshold and the FED threshold is less than the FEC limit threshold;
   asserting a link down condition when the preFEC BER falls below rises above the FEC limit threshold; and
   de-asserting the link down condition when the preFEC BER rises above falls below the FED threshold.

9. The method of claim 8, further comprising declaring an alarm if any of the FDD threshold, FED threshold, or FEC limit threshold is crossed and postFEC BER !=0.

10. The method of claim 9, wherein the alarm is not cleared unless postFEC BER is less than 10–e15 and (FED clears or FDD clears).

11. The method of claim 9, wherein the alarm is not cleared unless "PostFEC error is less than 10–e15 and FED clears and FDD clears".

12. The method of claim 8, further comprising de-asserting LD status when postFEC errors are less than 10–e15 and the BER is below one of T0, T1, or T2.

13. The method of claim 8, further comprising implementing a hold-off timer for de-asserting the link down condition.

14. The method of claim 13, wherein any change of the preFEC BER within a time specified by the hold-off timer does not cause a flapping of a link status.

15. A device configured to communicatively couple to an optical transmission medium of an optical communications network, the device configured to:
   determine a preFEC BER of a selected optical link;
   obtain a FEC Detected Degrade (FDD) threshold, FEC Excessive Degrade (FED) threshold, and FEC limit threshold for the selected optical link, wherein the FDD threshold is less than the FED threshold and the FED threshold is less than the FEC limit threshold;
   asserting a link down condition when the preFEC BER rises above the FEC limit threshold; and
   de-asserting the link down condition when the preFEC BER falls below the FED threshold.

16. The device of claim 15, the device further configured to declare an alarm if any of the FDD threshold, FED threshold, or FEC limit threshold is crossed and postFEC BER !=0.

17. The device of claim 16, wherein the alarm is not cleared unless postFEC BER is less than 10–e15 and (FED clears or FDD clears).

18. The device of claim 16, wherein the alarm is not cleared unless "PostFEC error is less than 10–e15 and FED clears and FDD clears".

19. The device of claim 15, the device further configured to de-assert LD status when postFEC errors are less than 10–e15 and the BER is below one of T0, T1, or T2.

20. The device of claim 15, the device further configured to implement a hold-off timer for de-asserting the link down condition.

* * * * *